US010280664B1

(12) United States Patent
Cruz Lopez et al.

(10) Patent No.: US 10,280,664 B1
(45) Date of Patent: May 7, 2019

(54) HINGE SYSTEM FOR A STORAGE BIN IN THE CARGO AREA OF A VEHICLE

(71) Applicant: GM GLOBAL TECHNOLOGY OPERATIONS LLC, Detroit, MI (US)

(72) Inventors: Jairo Abraham Cruz Lopez, Cuautitlán Izcalli (MX); Andres Omar Alvarez Lopez, Toluca (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 27 days.

(21) Appl. No.: 15/794,417

(22) Filed: Oct. 26, 2017

(51) Int. Cl.
| B60R 7/04 | (2006.01) |
| E05D 7/10 | (2006.01) |
| E05D 5/14 | (2006.01) |
| E05D 11/06 | (2006.01) |
| E05D 11/10 | (2006.01) |
| B60R 7/02 | (2006.01) |

(52) U.S. Cl.
CPC ............. *E05D 7/1044* (2013.01); *B60R 7/02* (2013.01); *E05D 5/14* (2013.01); *E05D 11/06* (2013.01); *E05D 11/1014* (2013.01); *E05Y 2900/53* (2013.01)

(58) Field of Classification Search
CPC ........... B60R 7/04; E05D 5/14; E05D 7/1005; E05D 7/1044; E05D 11/1014; E05D 11/06; E05Y 2900/538
USPC ................................ 296/37.8, 37.12, 24.34
See application file for complete search history.

(56) References Cited

U.S. PATENT DOCUMENTS

| 5,561,886 A * | 10/1996 | Flamme .................. E05D 5/065 16/260 |
| 2005/0282599 A1* | 12/2005 | Hehn ........................ B60R 7/04 455/575.8 |
| 2006/0174445 A1* | 8/2006 | Kim ........................ E05D 5/128 16/360 |
| 2015/0145271 A1* | 5/2015 | Ankolikar ............. E05D 15/502 296/37.8 |
| 2015/0337578 A1* | 11/2015 | Peer ......................... E05D 3/02 49/381 |
| 2015/0337581 A1* | 11/2015 | Ikemoto .................. E05D 7/105 49/381 |
| 2018/0371813 A1* | 12/2018 | Cherry ................ E05D 11/1071 |

FOREIGN PATENT DOCUMENTS

DE 102017206462 10/2017 ............... E05D 3/02

OTHER PUBLICATIONS

First Office Action for German Application No. 10 2018 126 565.4 dated Nov. 30, 2018; 6 pages.

* cited by examiner

*Primary Examiner* — Gregory A Blankenship

(57) ABSTRACT

A hinge includes a first member with a footing, an extension arm and a rod. The extension arm is connected to the footing and projects away therefrom. The rod is connected to the extension arm such that a center axis of the rod is disposed parallel to the footing. The hinge further includes a second member with a first end wall, a second end wall and a cradle wall. The first end wall is connected and spaced apart from the second end wall by the cradle wall to define a rounded receptacle configured to receive the rod. The second member includes a sleeve adjacent to the second end wall that covers a portion of the receptacle to define a cup wherein a portion of the rod is positioned inside the cup to permit rotation of the first member about the center axis and to limit radial movement.

20 Claims, 5 Drawing Sheets

HINGE SYSTEM FOR A STORAGE BIN IN THE CARGO AREA OF A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a hinge system for a storage bin in the cargo area of a vehicle.

Various storage bins, compartments or other enclosures in vehicles often have lids or other covers. The lids or covers can be lifted, rotated or otherwise moved in order to access the inside of the storage bin or compartment. A hinge system can be used to connect the lid to the storage compartment to permit a user to move the lid to access the inside of the storage bin.

Existing hinge designs can be difficult or time-consuming to install during the assembly. In addition, existing hinge designs can permit undesired movement of the lid relative to the storage bin during accelerations of the vehicle.

SUMMARY

In one example hinge in accordance with the present disclosure, a hinge includes a first member with a footing, an extension arm and a rod. The extension arm is connected to the footing and projects away therefrom. The rod is connected to the extension arm such that a center axis of the rod is disposed parallel to the footing. The hinge further includes a second member with a first end wall, a second end wall and a cradle wall. The first end wall is connected and spaced apart from the second end wall by the cradle wall to define a rounded receptacle configured to receive the rod therein. The second member also includes a sleeve adjacent to the second end wall that covers a portion of the receptacle to define a cup wherein a portion of the rod is positioned inside the cup to permit rotation of the first member about the center axis and to limit radial movement of the first member relative to the second member.

In one aspect, the footing includes a plurality of attachment points for attaching a lid of a storage bin to the first member.

In one aspect, the first member includes a retention feature that projects outward from an outer surface of the rod that is configured to engage a pocket in the second member to maintain the first member in an open position.

In one aspect, the first member further includes a crown projecting outward from an outer surface of the rod. The second member further includes an opening in the cradle wall configured to receive the crown therein and the crown is configured to limit axial movement of the first member relative to the second member.

In one aspect, the cradle wall defines a first notch positioned between the first end wall and the second end wall. The first notch has a width measured in a direction parallel to the center axis. The width of the first notch is greater than a width of the extension arm such that the extension arm can rotate into the first notch when the first member is rotated relative to the second member.

In one aspect, the second member is molded into a storage bin.

In one aspect, the sleeve is a rounded wall connected to the second end wall and the cradle wall.

In one aspect, the first end wall, the cradle wall and a receiving edge of the sleeve define an installation gap in the second member and an axial length of the installation gap is greater than an axial length of the rod such that the rod can be inserted into the second member through the installation gap.

In one aspect, the receiving edge of the sleeve is an axial edge of the sleeve located away from the second end wall.

In one aspect, the first member is installed into the second member by inserting the rod into the second member through the installation gap and moving the rod axially along the center axis to insert a distal end of the rod into the cup.

In one aspect, the first member is operable in an open position and in a closed position and the first member is moved from the open position to the closed position by rotating the first member relative to the second member about the center axis.

In one aspect, the first member rotates approximately 90 degrees when moved from the open position to the closed position.

In one aspect, the first member can be separated from the second member when the first member is in the open position.

In one aspect, the first member is prevented from separating from the second member when the first member is in the closed position.

In one aspect, the first member is limited from axial movement relative to the second member when the first member is in the closed position by walls of a notch positioned adjacent to the extension arm and by a shoulder of a slot in the cradle wall inside the cup.

In one aspect, the first member includes a support rib extending between the footing and the extension arm and the second member includes a notch configured to receive the support rib when the first member is rotated about the center axis.

In another example in accordance with the present disclosure, a storage compartment is positioned in a cargo area of a vehicle. The storage compartment includes a lid including a top surface opposite a bottom surface and a first hinge member connected to the bottom surface of the lid. The first hinge member includes a footing with a plurality of attachment points configured to connect the first hinge member to the lid and an extension arm connected to and projecting away from the footing. The first hinge member further includes a cylindrical rod connected to the extension arm and projecting orthogonally away from the extension arm toward a distal end of the rod such that a center axis of the rod is disposed parallel to the footing. The storage compartment also includes a storage bin with a plurality of walls to define a storage space therebetween. Tthe storage bin includes a second hinge member formed in at least one of the plurality of walls. The second hinge member includes a first end wall, a second end wall and a cradle wall defining a cylindrical receptacle configured to receive the rod. The first end wall and the second end wall are spaced apart from one another at opposite ends of the cylindrical receptacle by the cradle wall. The second hinge member also includes a a sleeve connected to the second end wall and the cradle wall. The sleeve covers a portion of the cradle wall to define a cylindrical hollow cup. The distal end of the rod is positioned inside the cup wherein the lid is secured to the storage bin and is operable in an open and closed position.

In one aspect, the lid is secured to the storage bin by inserting the rod into the receptacle and by moving the rod axially along the center axis to position the rod inside the cup.

In one aspect, the sleeve and the cradle wall surround at least a portion of the rod to prevent the lid from separating from storage bin after the lid is installed on the storage bin.

In one aspect, the lid includes a living hinge disposed between a first lateral side edge and a second lateral side edge. The living hinge is configured to permit a portion of the lid to be folded to cause a width of the lid to be less than a lateral distance between the first lateral side edge and the second lateral side edge.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

In one example hinge system in accordance with the present disclosure, a first member is connected to a lid or other cover. The first member is inserted into a second member included on or attached to the storage bin. The first member can rotate in the second member to permit the lid to rotate relative to the storage bin. In this manner, the lid can be easily moved from a closed to an open position.

The second member of the hinge system includes a rounded receptacle that is configured to receive a rod that is positioned on the first member. The second member also includes a sleeve that is positioned at one end of the receptacle that surrounds at least a portion of the rod of the first member. With this structure, the sleeve of the second member prevents non-rotational movement of the first member relative to the second member. The sleeve prevents the first member from being displaced from the receptacle during acceleration of the vehicle.

The second member additionally includes an opening located laterally adjacent to the sleeve. The opening in the second member permits the first member to be inserted into the receptacle of the second member and laterally moved so that the rod of the first member is positioned inside the sleeve. With such a configuration, a lid with one or more of the first members can be easily secured to a storage bin with one or more of the second members.

The present disclosure recites example hinge systems with reference to a storage bin or other compartment on a vehicle. As can be appreciated, the hinge system of the present disclosure can be used in other applications. The hinge system of the present disclosure, for example, can be used in household applications, industrial applications, marine applications, consumer product applications, and the like.

Figure 1:
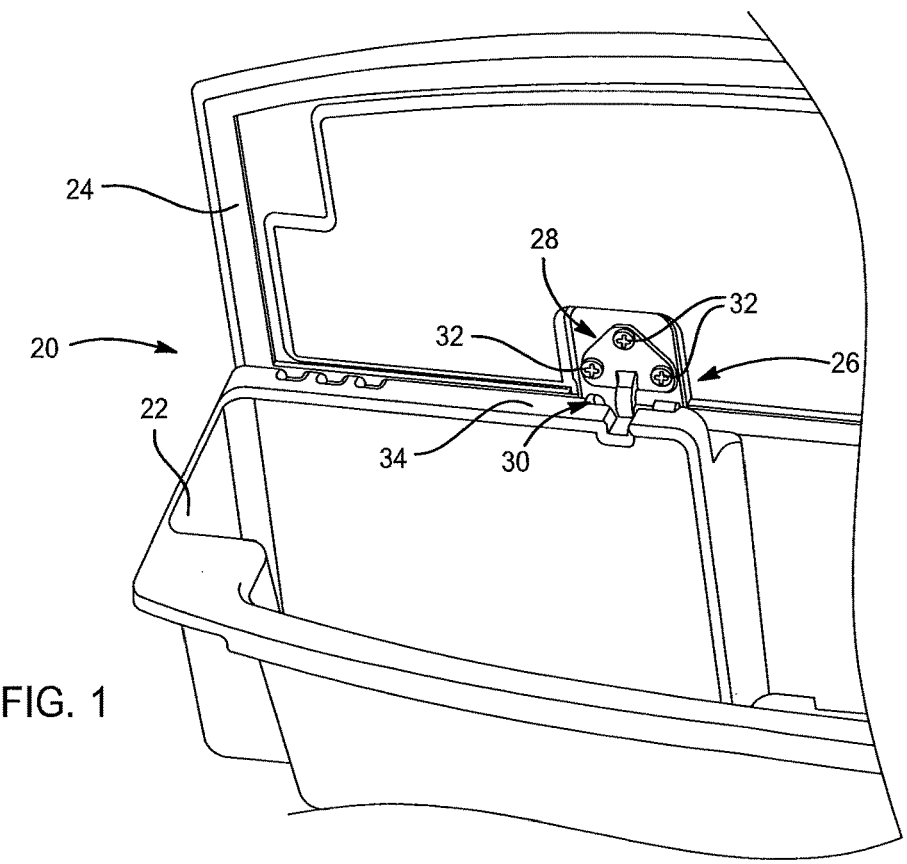
FIG. 1 is a view of a vehicle storage bin and lid with an example hinge system in accordance with the present disclosure.

Referring now to FIG. 1, a vehicle 20 includes a storage bin 22 with a lid 24. The storage bin 22, in this example, is positioned in the cargo area of the vehicle 20. The lid 24, as shown, is in an open position so that a user can access items that have been stored in the storage bin 22. As can be appreciated, the lid 24 can be moved into a closed position so that the lid 24 covers the storage bin 22.

As shown in FIG. 1, an example hinge system 26 is positioned at the interface of the lid 24 to the storage bin 22. The hinge system 26 includes a first member 28 and a second member 30. The first member 28 is connected to the lid 24 using three fasteners 32. In other examples, the first member 28 can be connected to the lid 24 using a different number of fasteners 32 or using a different attachment method. In still other examples, the first member 28 can be integrated into or molded as part of the lid 24.

The second member 30, in this example, is molded into an edge 34 of the storage bin 22. In other examples, the second member 30 can be formed as a separate piece and then attached to the storage bin 22.

Figure 2:
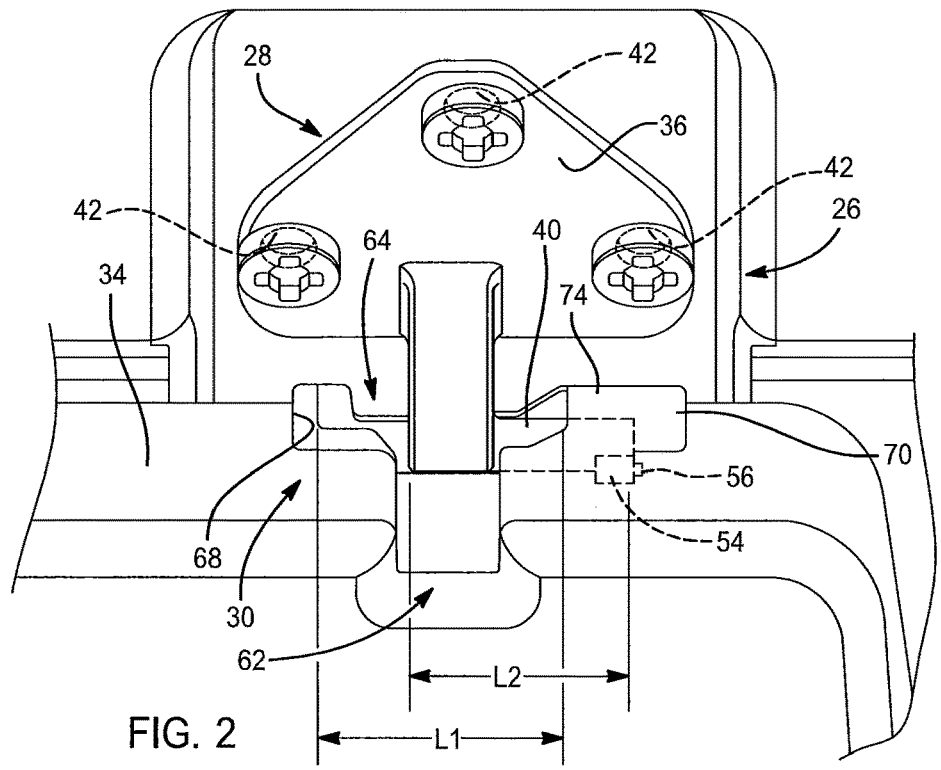
FIG. 2 is a magnified view of the example hinge system of FIG. 1.

As shown in FIG. 2, the first member 28 includes a footing 36, an extension arm 38 and a rod 40. In this example, the footing 36 is planar and includes three attachment points 42. The footing 36 is positioned adjacent to the lid 24 and is connected to the lid 24 by the three fasteners 32 inserted through the attachment points 42. In this example, the footing 36 has a triangular shape and the three attachment points 42 are positioned at each of the three corners of the footing 36. In other examples, the footing 36 can have other shapes or profiles or can be integrally formed as part of the lid 24.

Figure 3:
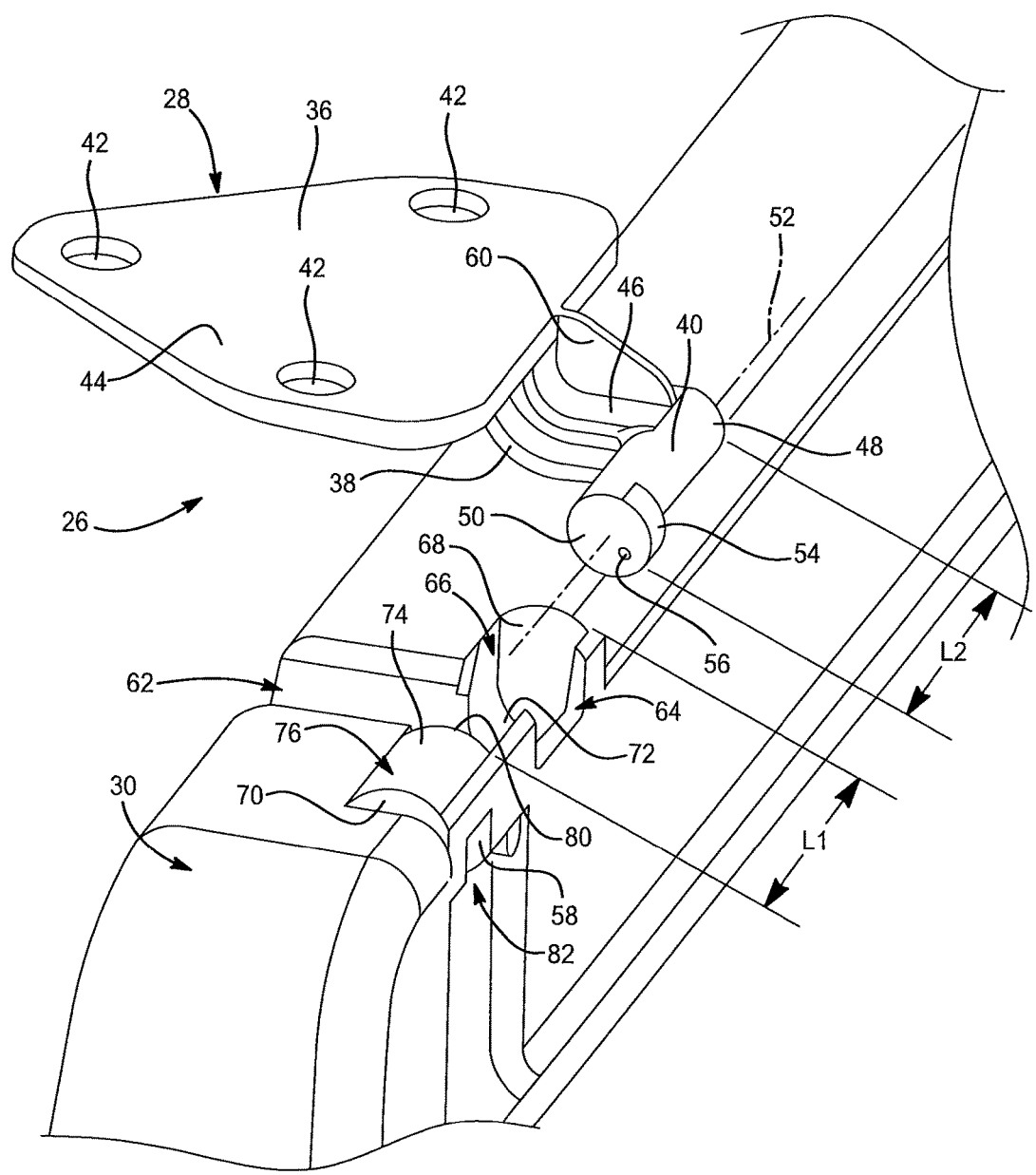
FIG. 3 is an exploded view of the example hinge system of FIG. 1.

The extension arm 38 projects away from the footing 36. The extension arm 38 projects away from the attachment surface 44 of the footing 36 in a direction perpendicular to the attachment surface 44 (or downward as shown in FIG. 3). In addition, the extension arm 38 projects away from the attachment surface 44 in a direction parallel to the attachment surface 44 (or forward as shown in FIG. 3). In this manner, the rod 40, connected to a hinge end 46 of the extension arm 38, is spaced apart from the footing 36 as shown. The extension arm 38, in this example, follows a smooth rounded path as it transitions from a first portion that is connected to the footing 36 to a second portion that projects forward of the footing 36. In other examples, the extension arm 38 can have other shapes such as two linear portions that generally project in a similar path to that previously described.

The rod 40, in this example, is cylindrical and is joined to the extension arm 38 at the hinge end 46. The rod 40 is joined to the extension arm 38 at a proximal end 48 and projects away from the extension arm 38 toward the distal end 50. The rod 40 is positioned on the first member 28 such that a center axis 52 of the rod 40 is parallel to the attachment surface 44 of the footing 36.

The rod 40, in this example, includes a crown 54 and a retention element 56. As will be further described below, the crown 54 projects outward from the surface of the rod 40 at the distal end 50. In this example, the crown 54 is a region of the rod 40 that has an outer diameter that is greater than the outer diameter of the rod 40. The crown 54, in this example, only projects from a portion of the circumference of the rod 40 at the distal end 50. In this example, the crown 54 projects from approximately 180 degrees of the circumference of the rod 40. In other examples, the crown 54 can project from the entire circumference of the rod 40 or from less than 180 degrees of the circumference of the rod 40. As will be explained further, the crown 54 can be positioned next to a shoulder 58 of the second member 30 in order to limit axial movement of the rod 40.

The retention element 56, in this example, is also positioned at the distal end 50 of the rod 40. The retention element 56 is a raised projection on the distal end 50. The retention element 56 interfaces with a rib, pocket or other structure in the second member 30 during rotation of the first member 28. The retention element 56 touches the rib, pocket or other structure in the second member 30 to hold the first member 28 in a desired position (or desired angle) relative to the second member 30. In this manner, the hinge system 26 can provide a hold-open feature that maintains the lid 24 in an open position.

The first member 28 can also include one or more ribs or other stiffening features to increase the strength and/or durability of the first member 28. As shown in FIG. 3, the first member 28, in this example, includes rib 60. The rib 60 is a flat piece of material that extends between the footing 36 and the rod 40 across the bend of the extension arm 38. In other examples, the rib 60 can have other shapes or profiles.

In the example shown, the first member 28 is a single component that is molded of a suitable plastic material. The first member 28, however, can be made of any suitable material and/or can be made of separate pieces that are connected to one another.

The second member 30 is configured to receive and retain the first member 28. The rod 40 of the first member 28 rotates about the center axis 52 in the second member 30 to permit the lid 24 to move from an open to a closed position over the storage bin 22. The second member 30, in the example shown in FIGS. 1-3, includes a first notch 62, a second notch 64 and a receptacle 66. The first notch 62 is an opening that extends from the receptacle 66 through the edge 34. The first notch 62 has a width that is greater than a width of the extension arm 38. As can be appreciated, the first notch 62 permits the first member 28 to rotate toward the second member 30. The first notch 62 is sized such that the extension arm 38 can nest inside the first notch 62 so that the footing 36 (and the lid 24 attached thereto) can move to the closed position.

The second notch 64, as shown in FIG. 3, also extends from the receptacle 66 through the edge 34. The second notch 64 is positioned on a side of the second member 30 away from the hinge end 46 of the extension arm 38. The second notch has a width that is greater than the width of the rib 60. As can be appreciated, the second notch 64 permits the first member to rotate to the open position (as shown in FIG. 1) and provides clearance between the second member 30 and the rib 60.

The receptacle 66 is a rounded feature of the second member 30 that is configured to receive the first member 28. In particular, the receptacle 66 is shaped to receive the rod 40 and permit the rotation of the rod 40 therein. The receptacle 66 includes a first end wall 68, a second end wall 70 and a cradle wall 72. The first end wall 68 is positioned at a first end of the receptacle 66 and the second end wall 70 is positioned at a second end of the receptacle. The cradle wall 72 extends between the first end wall 68 and the second end wall 70 to define the receptacle 66. The cradle wall 72, in this example, is a rounded wall that has a diameter that is greater than the outer diameter of the rod 40. As such, the rod 40 can be installed into and rotate inside the receptacle 66. The cradle wall 72 can also include a linear portion such that the cross section of the receptacle (or portions thereof) is U-shaped.

As further shown in this example, the receptacle 66 includes a sleeve 74. The sleeve 74 is a rounded wall positioned at or near the second end wall 70. The sleeve spans across the cradle wall 72 at or near the second end wall 70 to create a hollow cup 76 at the second end of the receptacle 66. The void inside of the cup 76 is large enough that the rod 40 can be inserted into the cup 76.

To install the first member 28 into the second member 30, the rod 40 is inserted through an installation gap. The installation gap is defined by a receiving edge 80 of the sleeve 74 and the first end wall 68. The installation gap has a length of L1 as measured in an axial direction parallel to the center axis 52. The rod 40 has a length of L2 as measured in an axial direction parallel to the center axis 52. The length L1 of the installation gap is greater than the length L2 of the rod 40. As such, the rod 40 can be inserted into the receptacle 66 through the installation gap.

After the rod 40 is positioned in the receptacle 66, the first member 28 is moved axially in the receptacle 66 toward the second end wall 70. In this manner, the distal end 50 of the rod 40 is moved into the cup 76. In this position, the sleeve 74 covers the distal end 50 of the rod 40. The sleeve 74 and the cradle wall 72 surround at least a portion of the distal end 50 of the rod 40. As can be appreciated, the sleeve 74 prevents the rod 40, and in turn the first member 28, from separating from the second member 30 after the rod 40 is moved axially into the cup 76.

As also shown in FIG. 3, the second member 30 includes a slot 82. The slot 82 is an opening in the cradle wall 72 that is located at or near the second wall 70. The slot 82 is sized and positioned accept the crown 54. A width of the slot that is measured in an axial direction parallel to the center axis 52 is greater than the width of the crown 54 measured in a parallel axial direction. When the rod 40 is moved axially into the cup 76, the crown 54 fits inside the slot 82. The crown 54 abuts a shoulder 58 of the slot 82 and limits axial movement of the rod 40 inside the cup 76.

Figure 4:
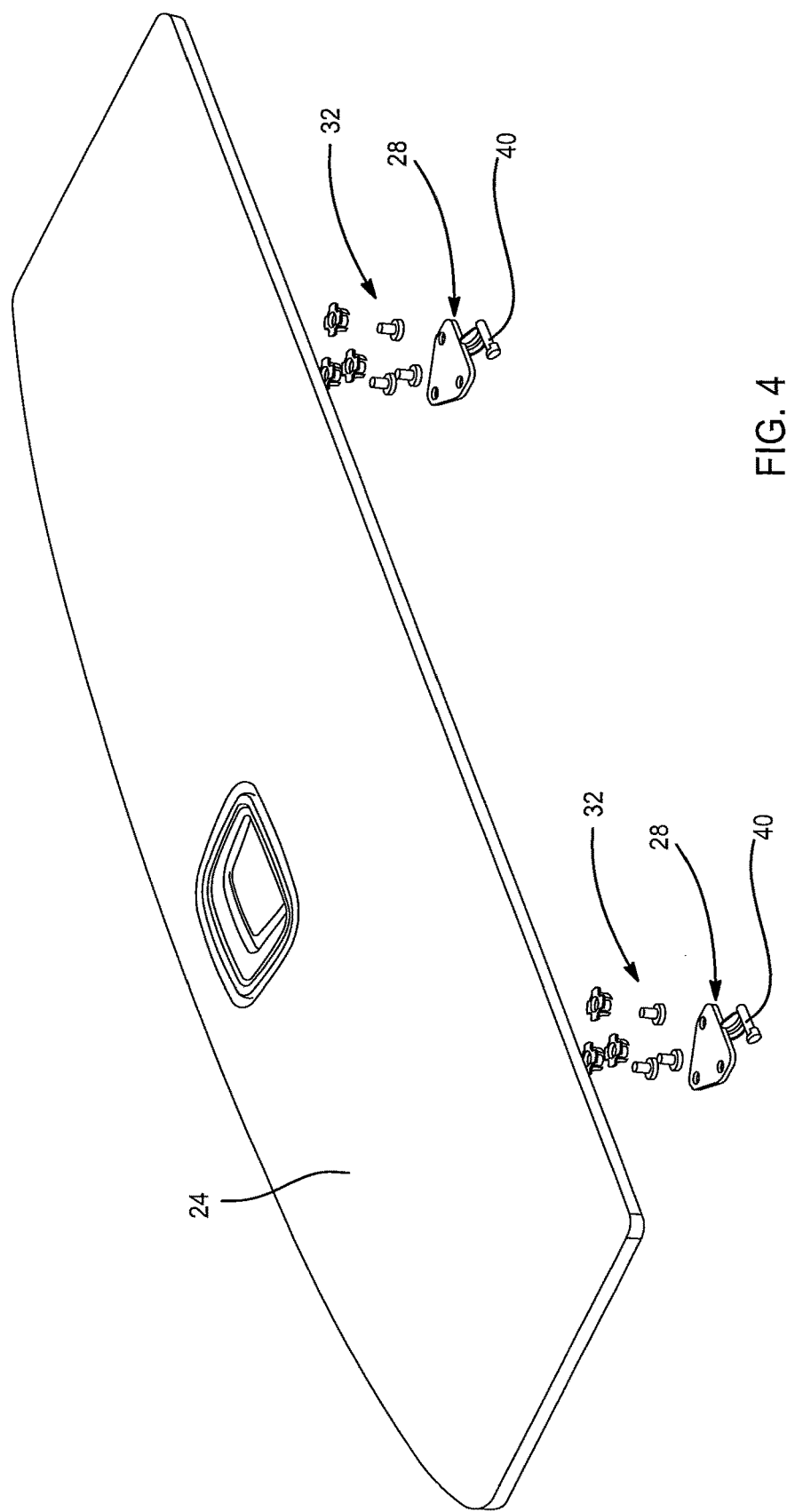
FIG. 4 is an exploded view of a storage bin lid and the example hinge system of FIG. 1.

One or more first members 28 can be connected to the lid 24 in the hinge system 26. As shown in FIG. 4, this example hinge system 26 includes two first members 28 connected to the lid 24. As shown, the first members 28 are connected to the lid 24 using the fasteners 32. In this example, two similar first members 28 are connected such that the rods 40 are oriented parallel to one another and the distal ends 50 of the rods 40 project away from the extension arms 38 in the same direction. In this configuration, the lid 24 can be connected to corresponding second members 30 (not shown) by inserting the rods 40 into the corresponding receptacles 66 and then moving the lid 24 in a transverse direction (i.e., an axial direction parallel to the center axis 52) such that the rods 40 move axially into the corresponding cups 76.

During installation, the rod 40 passes through the installation gap between the receiving edge 80 and the first end wall 68 of the second member 30 without interference. The rod 40 also easily slides in the receptacle 66 until it is seated in the cup 76. Thus, the lid 24 can be installed to the storage bin 22 with little effort.

Figure 5:
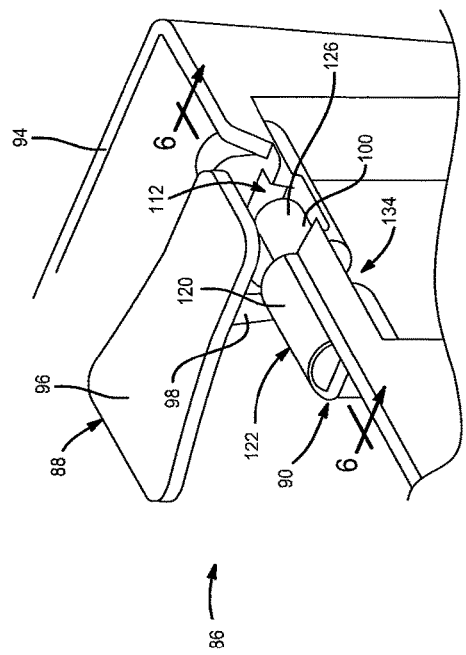
FIG. 5 is a view of another storage bin with another example hinge system in accordance with the present disclosure.
Figure 6:
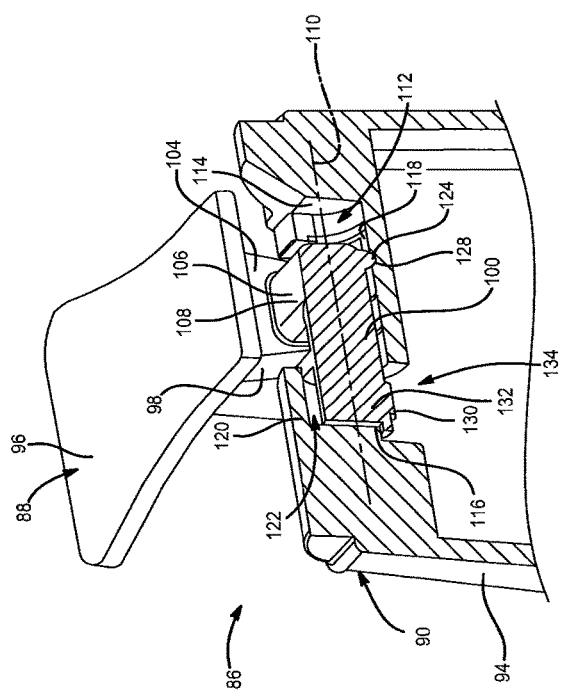
FIG. 6 is a sectional view of the example hinge system of FIG. 5 cut as indicated on FIG. 5.
Figure 7:
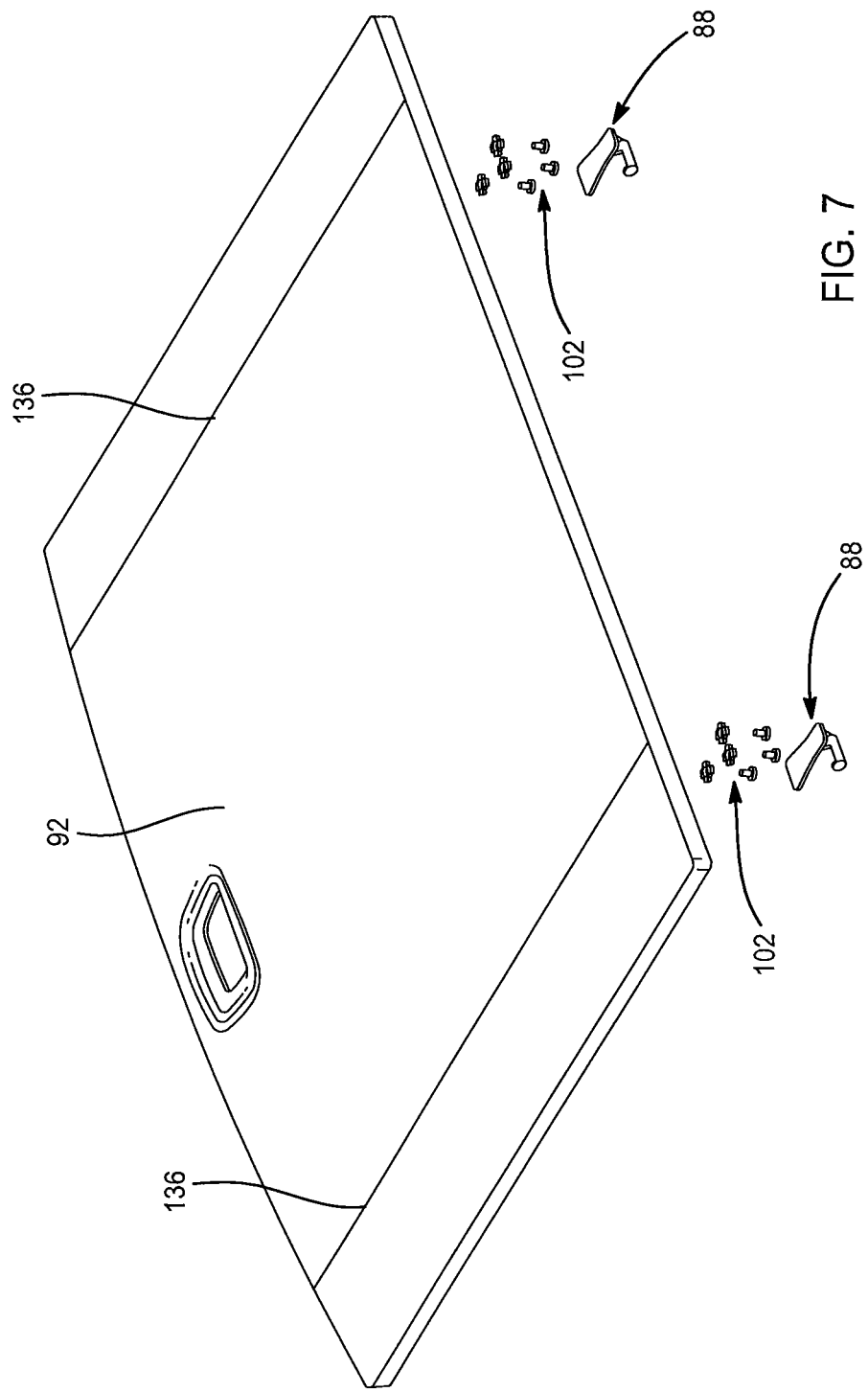
FIG. 7 is an exploded view of a storage bin lid and the example hinge system of FIG. 5.

Referring now to FIGS. 5-7, another example hinge system 86 is shown. This example hinge system 86 is similar in many respects to the hinge system 26 previously described. The hinge system 86 includes a first member 88 and a second member 90 used to connect a lid 92 to a storage bin 94.

The first member 88, in this example, includes a footing 96, an extension arm 98 and a rod 100. The footing 96, in this example, connects to the lid 92. While not shown, the footing 96 can include attachment points or other features to connect the footing 96 to the lid 92. As shown in FIG. 7, the footing 96 can be connected to the lid 92 using one or more fasteners 102.

The extension arm 98, in this example, projects away from the footing 96 and positions the rod 40 relative to the footing 96 as shown. The extension arm 98, in this example, includes a first linear portion 104 and a second linear portion 106. The first linear portion 104 extends under the footing 96 and the second linear portion 106 extends perpendicularly from the first linear portion 104. The rod 100 connects to a hinge end 108 of the second linear portion 106 to orient the rod 100 such that a center axis 110 of the rod 100 is parallel to the footing 96.

The second member 90 of the example hinge system 86 is also similar to the previously described second member 30 of the hinge system 26. The second member 90 includes a receptacle 112 defined by a first end wall 114, a second end wall 116 and a cradle wall 118. The receptacle 112 is an elongated, rounded feature in which the rod 100 is positioned. A sleeve 120 is located at or near the second end wall 116 of the receptacle 112. The sleeve 120 covers a portion of the cradle wall 118 to define a cup 122 near the second end wall 116 of the receptacle 112. The rod 100 is inserted axially in a direction parallel to the center axis 110 into the cup 122. In this manner, the rod 100 is retained relative to the second member 90.

The first member 88 of the hinge system 86 also includes a retention element 124. In this example, the retention element 124 is positioned at or near a proximal end 126 of the rod 100. The retention element 124 is a raised formation that projects outward from the outer diameter of the rod 100. The second member 90 includes a corresponding pocket 128 in the cradle wall 118. The retention element 124 and the pocket 128 are sized and shaped such that the retention element 124 fits inside of the pocket 128. The pocket 128 can include a rib or other structure that interferes with the retention element 124 when the first member 88 is rotated inside the second member 90. In this manner, the interference between the . pocket 128 and the retention element 124 can retain the first member 88 in an open position to hold the lid 92 in an open position relative to the storage bin 94.

As also shown in this example, the first member 88 includes a crown 130. The crown 130 is a raised area at or near a distal end 132 of the rod 100. The crown 130 has an outer diameter that is greater than the outer diameter of the rod 100. When the rod 100 is moved axially into the cup 122, the crown 130 seats inside a slot 134 in cradle wall 118 of the second member 90. As such, the crown 130 prevents axial movement of the rod 100 in the second member 90.

The hinge system 86 can be connected to the lid 92 in a similar manner to that previously described. As shown in the example of FIG. 7, the first member 88 is connected to the lid 92 using three fasteners 102. As shown, the two first members 88 are connected to the lid 92. The first members 88 are connected in the same orientation with respect to the lid 92. As shown, the rods 100 of the first members 88 are oriented in this manner so that the lid 92 can be installed onto a storage bin 94 by inserting the rods 100 into corresponding second members 90 and then moving the lid 92 in a transverse (or axial) direction to insert the rods 100 into the cups 122.

As can be appreciated, in some applications, such as in the rear cargo area of a vehicle, there may be obstacles that prevent the lid 92 from being moved in a transverse direction. For example, side storage areas, wheel wells or seat structures may be positioned laterally outward of the storage bin 94 in the rear cargo area of a vehicle. In these types of applications, the lid 92 can include one or more living hinges 136. The living hinges 136 are localized areas of the lid 92 in which the material has a reduced thickness. The lid 92 can be folded along the living hinges 136. When the lid 92 is folded along the living hinge(s) 136, the lid 92 has a reduced width.

If the lid 92 is installed in a location in which an obstacle (e.g., side storage area, wheel well or seat structure) prevents lateral movement of the lid 92, the lid can be folded along one or more of the living hinges 136. With the lid 92 folded, the rod 100 of the first member 88 can be inserted into the second member 90 and moved transversely (or axially) to insert the rods 100 into the cups 122 of the receptacles 112.

In the example shown in FIG. 7, the lid 92 includes two living hinges 136. In other examples, the lid 92 can include one living hinge or can include other configurations or locations of the living hinges 136.

In other examples of the hinge system, the features and structure of the first member and the features and structure of the second member can be reversed. For example, the first member with the footing, the extension arm and the rod can be molded into, attached or otherwise included as part of the storage bin. In such an example, the first end wall, the second end wall, the cradle wall and the sleeve can be included (or attached) on the lid. In such a reversed example, the functionality of the hinge system remains the same or similar to that previously described.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A hinge comprising:
   a first member including a footing, an extension arm and a rod, the extension arm connected to the footing and projecting away therefrom, the rod connected to the extension arm such that a center axis of the rod is disposed parallel to the footing;
   a second member including a first end wall, a second end wall and a cradle wall, the first end wall connected to and spaced apart from the second end wall by the cradle wall to define a rounded receptacle configured to receive the rod therein, the second member also including a sleeve adjacent to the second end wall that covers a portion of the receptacle to define a cup; and
   wherein a portion of the rod is positioned inside the cup to permit rotation of the first member about the center axis and to limit radial movement of the first member relative to the second member.

2. The hinge of claim 1 wherein the footing includes a plurality of attachment points for attaching a lid of a storage bin to the first member.

3. The hinge of claim 1 wherein the first member further includes a retention feature that projects outward from an outer surface of the rod that is configured to engage a pocket in the second member to maintain the first member in an open position.

4. The hinge of claim 1 wherein:
   the first member further includes a crown projecting outward from an outer surface of the rod;
   the second member further includes an opening in the cradle wall configured to receive the crown therein; and
   the crown is configured to limit axial movement of the first member relative to the second member.

5. The hinge of claim 1 wherein:
   the cradle wall defines a first notch positioned between the first end wall and the second end wall, the first notch having a width measured in a direction parallel to the center axis; and
   the width of the first notch is greater than a width of the extension arm such that the extension arm can rotate into the first notch when the first member is rotated relative to the second member.

6. The hinge of claim 1 wherein the second member is molded into a storage bin.

7. The hinge of claim 1 wherein the sleeve is a rounded wall connected to the second end wall and the cradle wall.

8. The hinge of claim 1 wherein:
   the first end wall, the cradle wall and a receiving edge of the sleeve define an installation gap in the second member; and
   an axial length of the installation gap is greater than an axial length of the rod such that the rod can be inserted into the second member through the installation gap.

9. The hinge of claim 8 wherein the receiving edge of the sleeve is an axial edge of the sleeve located away from the second end wall.

10. The hinge of claim 8 wherein the first member is installed into the second member by inserting the rod into the second member through the installation gap and moving the rod axially along the center axis to insert a distal end of the rod into the cup.

11. The hinge of claim 10 wherein:
    the first member is operable in an open position and in a closed position; and
    the first member is moved from the open position to the closed position by rotating the first member relative to the second member about the center axis.

12. The hinge of claim 11 wherein the first member rotates approximately 90 degrees when moved from the open position to the closed position.

13. The hinge of claim 11 wherein the first member can be separated from the second member when the first member is in the open position.

14. The hinge of claim 11 wherein the first member is prevented from separating from the second member when the first member is in the closed position.

15. The hinge of claim 14 wherein the first member is limited from axial movement relative to the second member when the first member is in the closed position by walls of a notch positioned adjacent to the extension arm and by a shoulder of a slot in the cradle wall inside the cup.

16. The hinge of claim 1 wherein:
    the first member includes a support rib extending between the footing and the extension arm; and
    the second member includes a notch configured to receive the support rib when the first member is rotated about the center axis.

17. A storage compartment positioned in a cargo area of a vehicle, the storage compartment comprising:
    a lid including a top surface opposite a bottom surface and a first hinge member connected to the bottom surface of the lid, the first hinge member comprising:
       a footing including a plurality of attachment points configured to connect the first hinge member to the lid;
       an extension arm connected to and projecting away from the footing; and
       a cylindrical rod connected to the extension arm and projecting orthogonally away from the extension arm toward a distal end of the rod such that a center axis of the rod is disposed parallel to the footing;
    a storage bin including a plurality of walls to define a storage space therebetween, the storage bin also including a second hinge member formed in at least one of the plurality of walls, the second hinge member comprising:
       a first end wall, a second end wall and a cradle wall defining a cylindrical receptacle configured to receive the rod, the first end wall and the second end wall spaced apart from one another at opposite ends of the cylindrical receptacle by the cradle wall; and
       a sleeve connected to the second end wall and the cradle wall, the sleeve covering a portion of the cradle wall to define a cylindrical hollow cup, the distal end of the rod positioned inside the cup; and
    wherein the lid is secured to the storage bin and is operable in an open and closed position.

18. The storage compartment of claim 17, wherein the lid is secured to the storage bin by inserting the rod into the receptacle and moving the rod axially along the center axis to position the rod inside the cup.

19. The storage compartment of claim 18, wherein the sleeve and the cradle wall surround at least a portion of the rod to prevent the lid from separating from storage bin after the lid is installed on the storage bin.

20. The storage compartment of claim 19, wherein the lid includes a living hinge disposed between a first lateral side edge and a second lateral side edge, the living hinge configured to permit a portion of the lid to be folded to cause a width of the lid to be less than a lateral distance between the first lateral side edge and the second lateral side edge.

* * * * *